(12) United States Patent
Kim et al.

(10) Patent No.: US 11,756,573 B2
(45) Date of Patent: Sep. 12, 2023

(54) ELECTRONIC APPARATUS AND CONTROL METHOD THEREOF

(71) Applicant: SAMSUNG ELECTRONICS CO., LTD., Suwon-si (KR)

(72) Inventors: Sooyeon Kim, Suwon-si (KR); Wonnam Jang, Suwon-si (KR); Sungrae Jo, Suwon-si (KR); Sungwook Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 710 days.

(21) Appl. No.: 16/715,394

(22) Filed: Dec. 16, 2019

(65) Prior Publication Data

US 2020/0211583 A1 Jul. 2, 2020

(30) Foreign Application Priority Data

Dec. 28, 2018 (KR) ........................ 10-2018-0172773

(51) Int. Cl.
*G10L 25/78* (2013.01)
*G10L 15/26* (2006.01)
*H04M 3/51* (2006.01)
*G10L 15/22* (2006.01)

(52) U.S. Cl.
CPC .............. *G10L 25/78* (2013.01); *G10L 15/22* (2013.01); *G10L 15/26* (2013.01); *H04M 3/5158* (2013.01)

(58) Field of Classification Search
CPC ......... G10L 15/22; G10L 15/26; G10L 25/78; H04M 2203/2027; H04M 2203/6027; H04M 2203/6072; H04M 3/4365; H04M 3/5158
See application file for complete search history.

(56) References Cited

U.S. PATENT DOCUMENTS

| 7,184,521 | B2 | 2/2007 | Sikora et al. |
| 7,822,981 | B2 | 10/2010 | Zhang et al. |
| 8,065,146 | B2 | 11/2011 | Acero et al. |

(Continued)

FOREIGN PATENT DOCUMENTS

| CN | 101674353 A | 3/2010 |
| CN | 107295149 A | 10/2017 |

(Continued)

OTHER PUBLICATIONS

Extended European Search Report dated Nov. 17, 2021 in corresponding European Application No. 19903154.3.

(Continued)

*Primary Examiner* — Angela A Armstrong
(74) *Attorney, Agent, or Firm* — Nixon & Vanderhye P.C.

(57) ABSTRACT

Disclosed is an electronic apparatus. The electronic apparatus includes a communicator comprising communication circuitry, and a processor configured to control the electronic apparatus to, in response to a call request being received through the communicator, transmit CAPTCHA information to an external device that requests the call, and in response to receiving response information about the CAPTCHA information from the external device, identify a counterpart that requests the call based on whether the response information is matched with the CAPTCHA information, and provide information on the identified counterpart.

16 Claims, 10 Drawing Sheets

(56) References Cited

U.S. PATENT DOCUMENTS

| | | |
|---|---|---|
| 8,457,960 B2 | 6/2013 | Srivastava et al. |
| 9,183,362 B2 | 11/2015 | Thompson |
| 9,226,159 B1 | 12/2015 | Cao et al. |
| 9,558,337 B2 | 1/2017 | Gross |
| 9,686,269 B2 | 6/2017 | Fu et al. |
| 10,104,061 B2 | 10/2018 | Fu et al. |
| 10,791,222 B2 | 9/2020 | Jiron et al. |
| 2004/0203794 A1* | 10/2004 | Brown ............... H04M 1/642 455/445 |
| 2008/0310604 A1 | 12/2008 | Agarwal et al. |
| 2009/0055193 A1 | 2/2009 | Maislos et al. |
| 2010/0158206 A1 | 6/2010 | Caceres et al. |
| 2013/0243177 A1 | 9/2013 | Altberg et al. |
| 2014/0119527 A1 | 5/2014 | Cohen |
| 2014/0163986 A1 | 6/2014 | Lee et al. |
| 2014/0304797 A1 | 10/2014 | Fu et al. |
| 2016/0150082 A1 | 5/2016 | Gonzales |
| 2017/0048388 A1 | 2/2017 | Sharpe |
| 2017/0318010 A1 | 11/2017 | Fu et al. |
| 2018/0302513 A1* | 10/2018 | Cohen ............... H04M 3/42382 |
| 2019/0394333 A1* | 12/2019 | Jiron ............... G06F 21/32 |

FOREIGN PATENT DOCUMENTS

| | | |
|---|---|---|
| EP | 3 410 328 | 5/2018 |
| JP | 5430120 | 2/2014 |
| JP | 2016-518656 | 6/2016 |
| KR | 10-0377836 | 3/2003 |
| KR | 10-2009-0033437 | 4/2009 |
| KR | 10-2014-0076056 | 6/2014 |
| KR | 10-2017-0016114 | 2/2017 |

OTHER PUBLICATIONS

Search Report and Written Opinion dated Apr. 17, 2020 in counterpart International Application No. PCT/KR2019/017820.

Chinese Office Action dated Feb. 10, 2023 for CN Application No. 201911344699.2.

Korean Office Action dated Jan. 25, 2023 for KR Application No. 10-2018-0172773.

* cited by examiner

ELECTRONIC APPARATUS AND CONTROL METHOD THEREOF

CROSS-REFERENCE TO RELATED APPLICATION

This application is based on and claims priority under 35 U.S.C. § 119 to Korean patent application number 10-2018-0172773, filed on Dec. 28, 2018, in the Korean Intellectual Property Office, the disclosure of which is incorporated by reference herein in its entirety.

BACKGROUND

1. Field

The disclosure relates to an electronic apparatus and a control method thereof. For example, the disclosure relates to an electronic apparatus that provides information on a counterpart requesting a call and a control method thereof.

2. Description of the Related Art

Recent development of electronic technology has led to development of various electronic apparatuses. In particular, an electronic apparatus capable of performing a call through a voice assistant has been developed.

Through the voice assistant, a user of a sender may conveniently use a variety of services, such as hair salon reservation, restaurant reservation, or the like.

However, it is also possible for the voice assistant to be used for a malicious purpose. The voice assistant, which has been developed for a malicious purpose, may sneakily acquire a counterpart's voice information or call contents, or the like, while the call is performed, and can use such personal information for a crime.

The voice assistant may also be used for an advertising purpose, in which case a call recipient may have to receive an unnecessary advertisement call continuously without knowing that a counterpart requesting a call is a real user or a voice assistant.

SUMMARY

Embodiments of the disclosure address the above-described necessity, and example embodiments of the disclosure provide a method and device to inform a call recipient regarding whether a counterpart that requests a call is a real user or a voice assistant so as to prevent and/or reduce personal information from being leaked by, for example, a malicious voice assistant.

According to an example embodiment, an electronic apparatus includes a communicator comprising communication circuitry, and a processor configured to control the electronic apparatus to: transmit CAPTCHA information to an external device that requests a call in response to a call request that is received through the communicator, and identify a counterpart that requests the call based on whether response information is matched with the CAPTCHA information in response to receiving the response information about the CAPTCHA information from the external device, and provide information on the identified counterpart.

According to an example embodiment, a method of controlling an electronic apparatus includes, transmitting CAPTCHA information to an external device that requests a call in response to a call request that is received, identifying a counterpart that requests the call based on whether response information is matched with the CAPTCHA information in response to receiving the response information about the CAPTCHA information from the external device, and providing information on the identified counterpart.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

General terms that are currently widely used were selected as terms used in embodiments of the disclosure in consideration of functions in the disclosure, but may be changed depending on the intention of those skilled in the art or a judicial precedent, the emergence of a new technique/technology, and the like. In addition, terms may have been arbitrarily chosen. The meaning of such terms may be described in detail in a corresponding portion of the disclosure. Therefore, the terms used in describing the various example embodiments of the disclosure should be defined based on the meaning of the terms and the contents throughout the disclosure rather than simple names of the terms.

When it is decided that a detailed description for the known art related to the disclosure may unnecessarily obscure the gist of the disclosure, the detailed description of the known art may be omitted.

Various example embodiments will be described in greater detail below with reference to the attached drawings, but it will be understood that the disclosure is not limited by the various example embodiments described herein.

Hereinafter, various example embodiments will be described in greater detail below with reference to the drawings.

Figure 1:
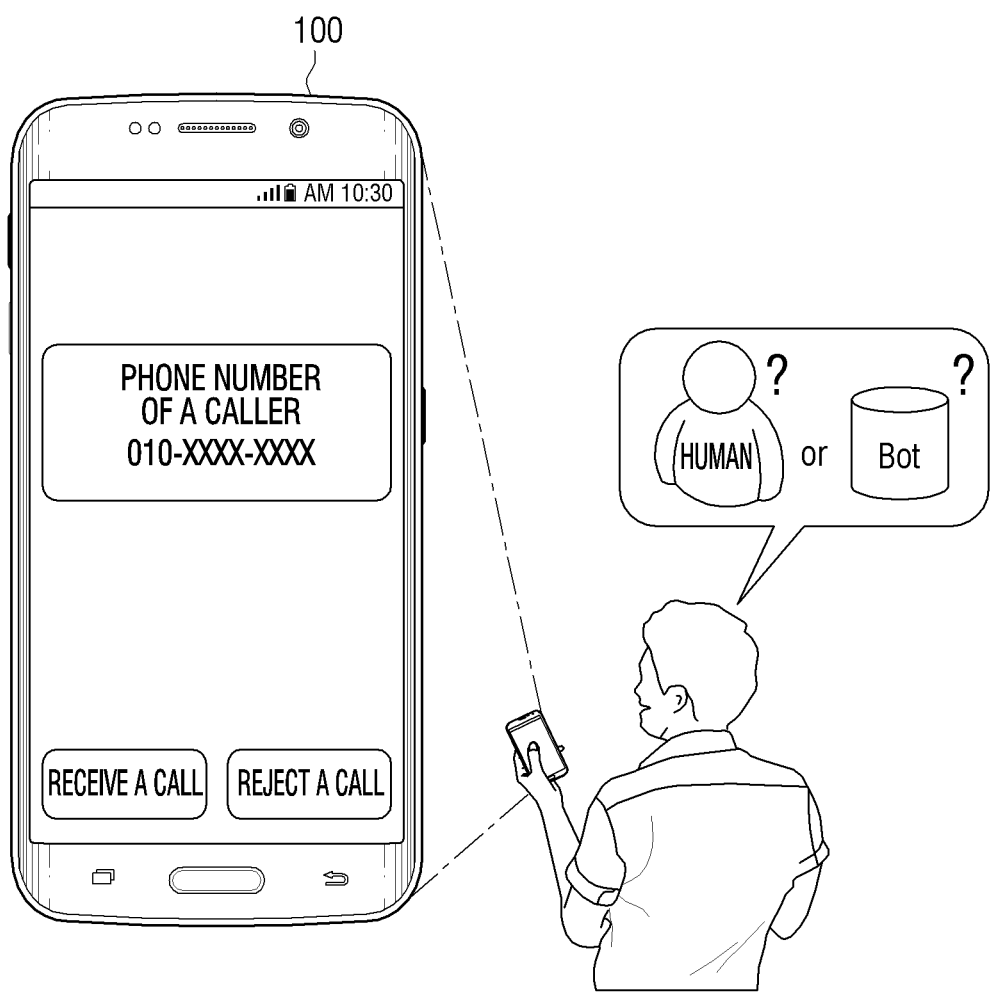
FIG. 1 is a diagram illustrating an example operation of an electronic apparatus according to an embodiment.

FIG. 1 is a diagram illustrating an example operation of an electronic apparatus according to an embodiment.

As illustrated in FIG. 1, an electronic apparatus 100 may, for example, and without limitation, be implemented as a smartphone. However, this is merely an example, and the electronic apparatus 100 may be implemented as various electronic apparatuses capable of performing a call. For example, the electronic apparatus 100 may be implemented, for example, and without limitation, as a wired telephone, a wireless telephone, an Internet telephone, a tablet PC, a notebook PC, a desktop PC, an interphone, or the like.

The call may be a general voice call performed by inputting a telephone number of the receiver to the sender (or the transmitter). However, this is merely an example, and the type of the call is not limited thereto. According to an example, the call may be a voice call that is performed using data. A voice call performed using data may be performed by inputting an identification ID of the receiver or a telephone number of the receiver through a specific application that is installed in the electronic apparatus 100, such as a smart phone. The call may be a video call. The video call is a call performed by transmitting and receiving voice and video between a sender and a receiver, which may be performed through a mobile communication network, and may be performed through an Internet network.

The electronic apparatus 100 may receive a call request from an external device (not shown).

The external device (not shown) may, for example, be a device capable of making a call, and may be implemented as a smartphone, a wired telephone, a wireless telephone, an Internet telephone, a tablet PC, a notebook PC, a desktop PC, an interphone, or the like, but is not limited thereto.

The external device (not shown) may be implemented as a server. In this example, the server may transmit a call request received from the sender to the electronic apparatus 100.

Hereinbelow, for convenience of description, unless otherwise mentioned, it will be described that the sender is an external device (not shown) and the receiver is the electronic apparatus 100.

Upon receiving a call request from an external device (not shown), the electronic apparatus 100 may determine (identify) a counterpart requesting a call.

The counterpart that requested the call may be a user or a voice assistant. The voice assistant may be referred to as a voice bot, or the like, and may refer, for example, to software (or a program) that performs a call as if it is a real human. In this example, the voice assistant may use an artificial intelligence model to recognize the user voice and provide a reply thereto. The artificial intelligence model may include, but is not limited to, a deep neural network (DNN), a recurrent neural network (RNN), a bidirectional recurrent deep neural network (BRDNN), or the like.

For example, when the caller directly transmits a call request through the sender, the counterpart of the call request may be a user and, the user of the electronic apparatus 100 may perform a call with the user of the sender.

When the caller indirectly transmits a call request through the voice assistant, the counterpart of the call request may be the voice assistant. In this example, the user of the electronic apparatus 100 may perform a call with the voice assistant.

As described above, the voice assistant, which has been developed for a malicious purpose, may illegally acquire voice information or call content of the counterpart while the call is being performed, and use it for a crime. Accordingly, the user of the electronic apparatus 100 needs to recognize whether the counterpart who requested the call is a user or a voice assistant, and has to prepare for a case where the personal information is leaked.

The electronic apparatus 100 according to an embodiment may provide information regarding whether the counterpart requesting a call is a user or a voice assistant. This will be described in a greater detail below with reference to FIG. 2.

Figure 2:
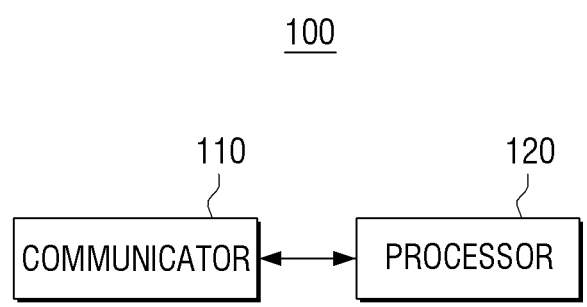
FIG. 2 is a block diagram illustrating an example electronic apparatus according to an embodiment.

FIG. 2 is a block diagram illustrating an example electronic apparatus according to an embodiment.

Referring to FIG. 2, the electronic apparatus 100 according to an embodiment includes a communicator (e.g., including communication circuitry) 110 and a processor (e.g., including processing circuitry) 120.

The communicator 110 may include various communication circuitry and may be connected to the network through wireless communication or wired communication and perform communication with an external device.

Wireless communication may be, for example, and without limitation, cellular communication protocol. In this example, the communicator 110 may perform communication using, for example, and without limitation, at least one of long-term evolution (LTE), LTE advanced (LTE-A), a code division multiple access (CDMA), a wideband CDMA (WCDMA), a universal mobile telecommunications system (UMTS), a wireless broadband (WiBro), a global system for mobile communications (GSM), and the like.

The wireless communication may, for example, include near distance communication protocol. The communicator 110 may perform communication using, for example, and without limitation, at least one of wireless fidelity direct (Wi-Fi direct), Bluetooth, near field communication (NFC), Zigbee, or the like.

Wired communications may be, for example, and without limitation, at least one of a universal serial bus (USB), a high definition multimedia interface (HDMI), a recommended standard 232 (RS-232), a plain old telephone service (POTS), or the like.

The network may include, for example, a telecommunications network, and may include at least one of, for example, and without limitation, a computer network (for example, local area network (LAN), a wide area network (WAN)), the Internet, a telephone network, or the like.

The communicator 110 may include a cellular module including various communication circuitry, such as, for example, and without limitation, a Wi-Fi module, a Bluetooth module, global navigation satellite system (GNSS) module (for example: a global positioning system (GPS) module, Glonass module, Beidou module, or Galileo module), a near field communication (NFC) module, radio frequency (RF) module, or the like.

The cellular module may provide at least one of, for example, and without limitation, a voice call, a video call, a text service, an Internet service, or the like, through a communication network. According to an embodiment, the cellular module may perform the discrimination and authentication of the electronic apparatus within the communication network using a subscriber identity module (example: a subscriber identification module (SIM) card). According to an example embodiment, the cellular module may perform at least some of the functions that the processor may provide. According to an example embodiment, the cellular module may include, for example, a communication processor (CP).

Each of the Wi-Fi module, the Bluetooth module, the GNSS module, or the NFC module may include various communication circuitry and a processor for processing data to be transmitted and received. According to an example embodiment, at least a portion (example: two or more) of a cellular module, a Wi-Fi module, a Bluetooth module, a GNSS module, an NFC module, or the like, may be included in one integrated chip (IC) or an IC package.

The RF module may, for example, transmit and receive a communication signal (example: an RF signal). The RF module may include, for example, and without limitation, a transceiver, a power amp module (PAM), a frequency filter, a low noise amplifier (LNA), an antenna, or the like.

According to an embodiment, at least one of the cellular module, the Wi-Fi module, the Bluetooth module, the GNSS module, the NFC module, etc. may transmit and receive an RF signal through a separate RF module.

The communication method described above is merely an example, and the communicator 110 may perform communication with an external device through various communication methods.

The processor 120 may include various processing circuitry for controlling the overall operation of the electronic apparatus 100. The processor 120 may control a plurality of hardware or software components connected to the processor 120 by driving an operating system or an application program, and perform various data processing and operations. The processor 120 may include, for example, and without limitation, one or more of a central processing unit (CPU), an application processor (AP), a communication processor (CP), or the like. The processor 120 may be implemented, for example, and without limitation, as at least one of a general processor, a digital signal processor, an application specific integrated circuit (ASIC), a system on chip (SoC), a microcomputer (MICOM), or the like.

The processor 120 may receive a call request through the communicator 110. For example, the processor 120 may receive a call request from an external device through a mobile communication network, a wired communication network, or the Internet. The external device may, for example, include a device for transmitting a call request, and may be the sender that attempts to connect a call to the electronic apparatus 100.

Upon receiving a call request through the communicator 110, the processor 120 may control the electronic apparatus to transmit information on Completely Automated Public Turing test to tell Computers and Humans Apart (CAPTCHA) information to the external device requesting a call. The CAPTCHA information may include information enabling the electronic apparatus to distinguish whether the counterpart of the call request is the user or the voice assistant.

For example, the CAPTCHA information may include information on audio CAPTCHA.

The audio CAPTCHA may refer, for example, to the CAPTCHA that distinguishes whether the counterpart of the call request is the user or the voice assistance, using a difference between a computer and a human in terms of colloquial language recognition ability.

When a call request is received from an external device, the processor 120 may generate a voice file including any word or number and distort the audio corresponding to the generated voice file. The processor 120 may control the communicator 110 to transmit a voice signal including the distorted audio to an external device. The distorted audio may include noisy sound (or noise), or the like.

For example, when a call request is received from the external device, the processor 120 may distort audio such as "please input 021887," and control the communicator 110 to transmit the voice signal including the distorted audio to the sender.

Upon receiving the response information on the CAPTCHA information from the external device, the processor 120 may determine the counterpart requesting a call based on a matching state between the response information and the CAPTCHA information.

For example, when the response information and the CAPTCHA information match each other, the processor 120 may determine that the counterpart requesting a call is a user, and when the response information and the CAPTCHA information do not match each other, the processor 120 may determine that the counterpart requesting a call is the voice assistant.

For example, as in the above-described embodiment, when the audio such as "please enter 021887" is distorted and transmitted to the external device, upon receiving response information including information about "021887" from the external device, the processor 120 may determine that the response information and the CAPTCHA information match each other, and determine that the counterpart requesting the call is the user. On the other hand, if response information including information other than "021887" is received from the external device, the processor 120 may determine that the response information and the CAPTCHA information do not match, and determine that the counterpart requesting a call is the voice assistant.

Even in a case where response information is not received from the external device, the processor 120 may determine that the counterpart requesting a call is the voice assistant.

For example, the processor 120, when response information is not received within a predetermined time from the time when CAPTCHA information is transmitted, may determine that the counterpart requesting a call is the voice assistant. For example, the predetermined time may be set or changed in a various manner according to a user command. For example, the predetermined time may be ten seconds.

This reflects that there is a high probability that the counterpart of the call request is the voice assistance, if the response information is not received, or response information is received after a predetermined time.

The processor 120 may provide information about the counterpart of the call request. For example, if it is determined that the counterpart of the call request is a person, the processor 120 may provide information that the counterpart of the call request is a person, and if it is determined that the counterpart of the call request is the voice assistant, the processor 120 may provide information that that the counterpart of the call request is the voice assistant.

Accordingly, the user of the electronic apparatus 100 may check whether the counterpart requesting a call is the user or the voice assistant, and may prepare for a case where personal information is leaked by a malicious voice assistant.

The aforementioned audio CAPTCHA is merely an example, and the CAPTCHA information may include various CAPTCHA information such as, for example, and without limitation, a text CAPTCHA, image CAPTCHA, motion CAPTCHA, or the like.

The text CAPTCHA may refer, for example, to a technology to distinguish whether the counterpart of the call request is the user or the voice assistant through a text image that is edited so that the computer may not recognize.

In this example, when a call request is received from the external device, the processor 120 may generate an image file including an arbitrary word or number that is edited so that computer may not recognize, and control the communicator 110 to transmit an image file to an external device.

For example, upon receiving a call request from an external device, the processor 120 may control the communicator 110 to transmit an image file edited so that computer may not recognize "021887" to an external device.

When the processor 120 receives response information including information about "021887" from the external device, the processor 120 may determine that the counterpart requesting a call is a user, and if the response information including information about "021887" is not received from the external device, the processor 120 may determine that the counterpart requesting a call is the voice assistant.

The image CAPTCHA may refer, for example, to a technology to distinguish whether the counterpart of the call request is a user or a voice assistant, through a photo or a drawing image.

Upon receiving a call request from the external device, the processor 120 may control the communicator 110 to transmit an arbitrary photo or a drawing image to an external device.

For example, upon receiving a call request from the external device, the processor 120 may control the communicator 110 to transmit a photo of a dog to an external device.

Receiving response information including information on a "dog," from an external device, the processor 120 may determine that the counterpart requesting the call is a user, and information about the "dog" is not received from the external device, the processor 120 may determine that the counterpart requesting a call is the voice assistant.

The motion CAPTCHA may refer, for example, to a technology to distinguish whether the counterpart of the call request is a user or a voice assistance based on whether the required motion is input to the sender.

For example, when a call request is received from the external device, the processor 120 may control the communicator 110 to transmit a message requesting input of a "V" shape motion to the external device.

When response information including information on "V" motion is received from the external device, the processor 120 may determine that the counterpart requesting a call is a user, and when response information including information on "V" motion is not received from the external device, the processor 120 may determine that the counterpart requesting a call is the voce assistant.

In addition, CAPTCHA information may include a variety of information, such as, for example, and without limitation, slide CAPTCHA that requires moving a horizontal bar displayed on a screen to a specific position, social CAPTCHA that requires matching the face and name of the person, or the like.

When response information is received after a predetermined time from a time when CAPTCHA information is transmitted, the processor 120 may control the communicator 110 to transmit different CAPTCHA information to the external device.

The received response information may include a response matching the CAPTCHA information. In the above-described embodiment, for a distorted audio output such as "Please input 021887", information regarding "021887" may be received from an external device.

This reflects that there is a high possibility that the counterpart of the call request is the voice assistance, if the response information matching the CAPTCHA is received after a predetermined time, in order to more correctly determine the counterpart of the call request.

The another CAPTCHA information transmitted to an external device may be CAPTCHA information in a type that is different from CAPTCHA information that is previously transmitted.

For example, when the pre-transmitted CAPTCHA information includes information about audio CAPTCHA, the CAPTCHA information in a different type may include at least one of text CAPTCHA, image CAPTCHA, motion CAPTCHA, and slide CAPTCHA.

When the response information for the above-described another type of CAPTCHA information is received, the processor 120 may determine a counterpart that requested the call based on whether the received response information and the another CAPTCHA information described above match with each other, and may provide information about the determined counterpart.

The example embodiment may further include a memory (not shown) configured to store a plurality of telephone numbers.

The processor 120 may control the electronic apparatus to transmit CAPTCHA information to an external device based on whether a telephone number corresponding to the counterpart requesting a call matches a plurality of telephone numbers prestored in the electronic apparatus 100.

For example, when the call request is received, the processor 120 may determine whether a phone number corresponding to the counterpart that requested the call matches with a plurality of prestored phone numbers, and when the phone number corresponding to the counterpart that requested the call does not match the plurality of prestored telephone numbers, the processor 120 may transmit CAPTCHA information to an external device.

For example, when the phone number corresponding to the counterpart requesting a call does not match a plurality of pre-stored phone numbers, there is a high possibility that the call recipient does not know the voice of the caller, so it is necessary to let the call recipient know whether the counterpart of call request is the user or the voice assistant.

When the telephone number corresponding to the counterpart requesting a call matches the plurality of prestored telephone numbers, the processor 120 may not transmit CAPTCHA information to an external device.

When the telephone number corresponding to the counterpart requesting a call matches the plurality of prestored telephone numbers, the call recipient knows the voice of the caller, and thus, it is not necessary to inform the recipient whether the counterpart of the call request is a user or the voice assistant. Through this, the embodiment may avoid unnecessary processor operations.

It has been described that operations are performed for the electronic apparatus 100 to determine whether the counterpart requesting a call is the user or the voice assistant, however, it will be understood that the operations may be performed by a server (not shown).

As an example embodiment, when a signal requesting a call is received from an external device to the electronic apparatus 100, the server (not shown) may transmit CAPTCHA information to the external device, and when response information is received from an external device, the server may determine whether the counterpart requesting a call is a user or a voice assistant based on matching state of the CAPTCHA information and the response information, and provide information about the determination result to the electronic apparatus 100.

When a server (not shown) receives a signal for requesting transmission of CAPTCHA information from the electronic apparatus 100, the server may determine whether the counterpart requesting a call is a user or a voice assistant based on the matching state between CAPTCHA information and the response information, and provide the information on the determination result to the electronic apparatus 100.

Figure 3A:
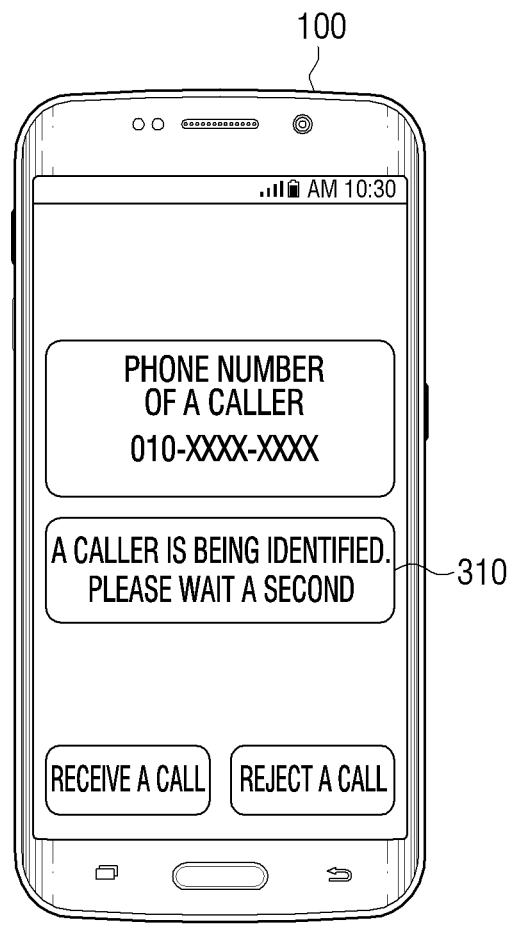
FIGS. 3A and 3B are diagrams illustrating an example of providing information on a counterpart of a call request according to an embodiment.
Figure 3B:
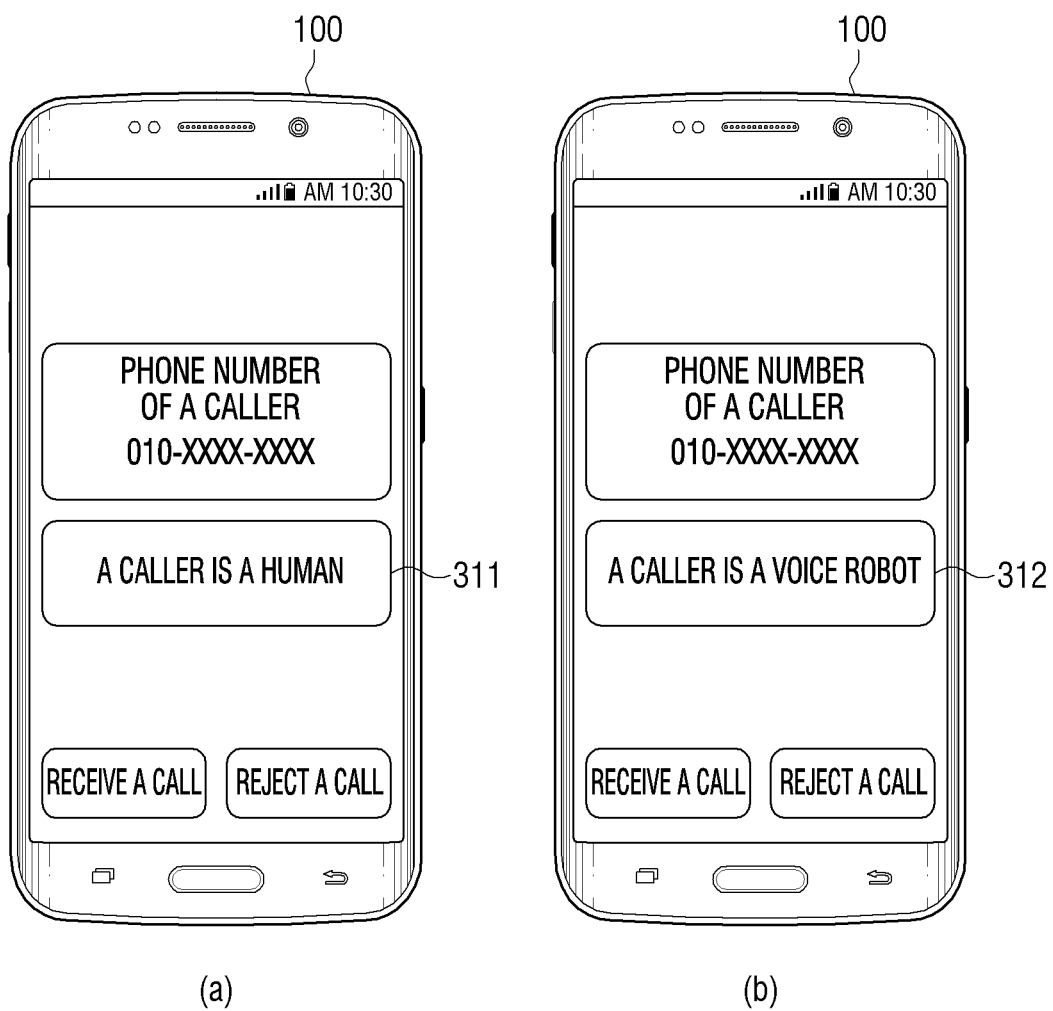

FIGS. 3A and 3B are diagrams illustrating an example of providing information on a counterpart of a call request according to an embodiment.

When a call request is received, the processor 120 may transmit the CAPTCHA information in a call waiting state to an external device. The processor 120 may transmit the CAPTCHA information to an external device before a call is connected.

As illustrated in FIG. 3A, the processor 120 may control the electronic apparatus 100 to display information 310 indicating that a counterpart requesting a call is being determined through a display.

When the call request is received from an external device through a mobile communication network, a wired communication network, or the Internet, the processor 120 may identify the sender based on identification information of the sender included in the call request. The processor 120 may transmit the CAPTCHA information to the identified sender, and may display information 310 indicating that the counterpart requesting the call is being determined through the display.

When the response information on the CAPTCHA information is received from an external device, the processor 120 may determine the counterpart of the call request based on a matching state between response information and CAPTCHA information, and provide information on the determination result.

For example, when the response information and CAPTCHA information are matched, the processor 120 may determine the counterpart of the call request as a user and as illustrated in FIG. 3B (a), the processor 120 may display information 321 that the counterpart of the call request is the user through a display.

When the response information and CAPTCHA information are not matched, the processor 120 may determine the counterpart of the call request as the voice assistant and as illustrated in FIG. 3B(b), the processor 120 may display information 322 that the counterpart requesting a call is the voice assistant through a display.

Accordingly, the user of the electronic apparatus 100 may recognize the counterpart of the call request from a call waiting state that is before call connection, and may determine whether or not to perform a call.

It has been described herein as providing information about the counterpart of the call request through the display, or the like, but is not necessarily limited thereto. According to an embodiment, the processor 120 may output audio including information about a counterpart of a call request through a speaker.

Figure 4A:
FIGS. 4A and 4B are diagrams illustrating an example screen displayed on a screen of a sender according to an embodiment.
Figure 4B:
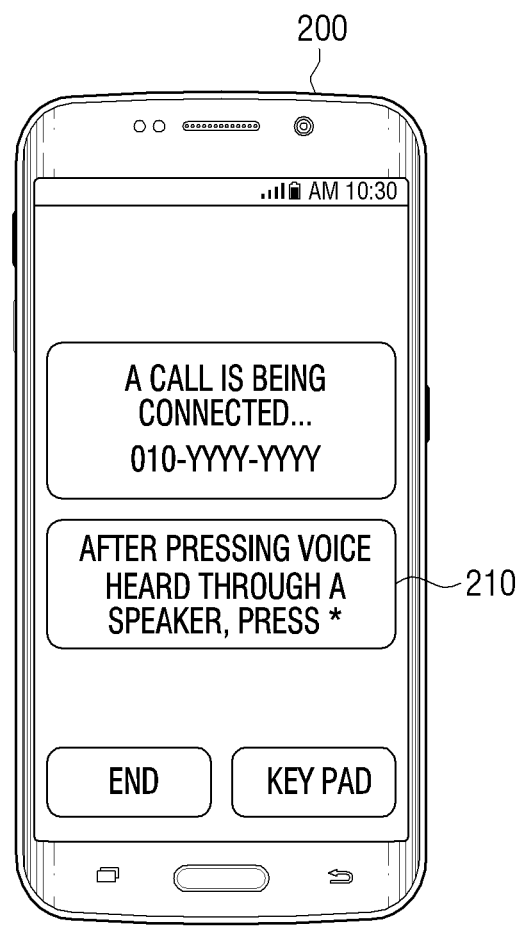

FIGS. 4A and 4B are diagrams illustrating an example screen displayed on a screen of a sender according to an embodiment.

When a user command for attempting a call connection is received, the sender 200 may display a screen including information indicating that the call is being connected, as shown in FIG. 4A. In this example, the sender may transmit the identification information of the sender and the identification information of the receiver to the electronic apparatus 100 through a mobile communication network, a wired communication network, the Internet, or the like.

The CAPTCHA information may be received from the electronic apparatus 100, the sender 200 may display a screen to lead to answer the CAPTCHA information. For example, when information on the audio CAPTCHA is included in the CAPTCHA information, a UI 210 requesting input of a voice that is heard through a speaker may be displayed on a screen of the sender as illustrated, for example, in FIG. 4B.

If a response to the CAPTCHA information is input, the sender 200 may transmit the response information to the electronic apparatus 100, and the electronic apparatus 100, as described above, based on whether the response information and CAPTCHA information are matched with each other, may determine the counterpart of the call request and provide information about the counterpart.

Figure 5:
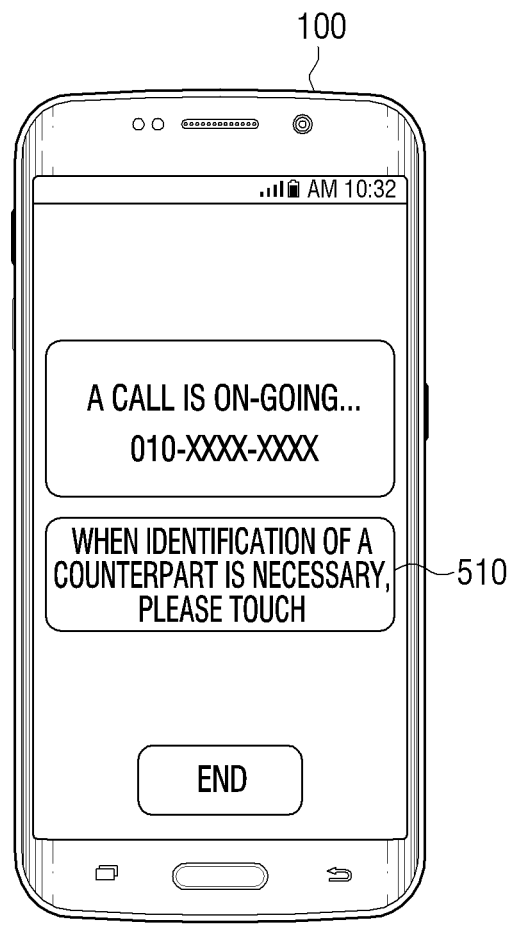
FIG. 5 is a diagram illustrating an example of identifying a counterpart of a call request when a call is on-going according to an embodiment.

FIG. 5 is a diagram illustrating an example of identifying a counterpart of a call request during when a call is on-going according to an embodiment.

When a user command to accept the call request is received, the processor 120 may connect a call with the counterpart requesting a call.

When a user command to determine the call counterpart is received during performing a call with the counterpart, the processor 120 may transmit CAPTCHA information to an external device.

For example, as illustrated in FIG. 5, while a UI 510 to confirm a counterpart of a call request is displayed, when a user command to touch the UI is received, the processor 120 may transmit the CAPTCHA information to an external device.

When response information is received from an external device, as described above, the processor 120 may determine a counterpart of the call request based on whether the response information matches with the CAPTCHA information and provide information on the counterpart.

Accordingly, the electronic apparatus 100 may confirm whether the counterpart is a real user or a voice assistant while performing a call.

Figure 6:
FIG. 6 is a diagram illustrating an example of transmitting CAPTCHA information corresponding to a user voice according to an embodiment.

FIG. 6 is a diagram illustrating an example of transmitting CAPTCHA information corresponding to a user voice according to an embodiment.

When a user command is received while call with the counterpart requesting a call is connected, the processor 120 may transmit the CAPTCHA information corresponding to a user voice that is input through a microphone of the electronic apparatus 100 to an external device.

For example, as illustrated in FIG. 6, the processor 120 may display a UI 610 for transmitting CAPTCHA information corresponding to a user voice while performing a call. When the user command for touching the UI 610 is received, the processor 120 may transmit CAPTCHA information corresponding to the user voice input through the microphone to an external device.

For example, the CAPTCHA information corresponding to the user voice may include information about the user voice to which the audio CAPTCHA technique is applied. For example, when a user command for touching the UI 610 is received, the processor 120 may distort a user voice input through a microphone and transmit the distorted user voice to an external device. The distorted user voice may include noisy sound (or noise).

The embodiment is merely an example, and the processor 120 may transmit the text CAPTCHA corresponding to a user voice that is input through a microphone to an external device. For example, the processor 120 may convert the user voice to a text by applying the speech to text (STT) algorithm to a user voice, edit the converted text to a format which computer may not recognize, and transmit the edited text to an external device.

Accordingly, the user of the electronic apparatus 100 may transmit a voice including personal information safely to an external device.

It has been described that the electronic apparatus 100 transmits the CAPTCHA information corresponding to the user voice input through the microphone to an external device, but this may be performed by a server (not shown). In an embodiment, if a signal for requesting to transmit CAPTCHA information corresponding to a user voice is received from the electronic apparatus 100, the server (not shown) may distort the user voice received from the electronic apparatus 100 and transmit the distorted user voice to an external device.

It has been described that when a user command is received, the CAPTCHA information corresponding to a user voice is transmitted to an external device, but this may be automatically performed without receiving a user command.

For example, the electronic apparatus 100 or the server (not shown) may analyze the contents of the call through the STT algorithm, and when a preset word is included in the contents of the call, the electronic apparatus 100 or server may apply the various CAPTCHA techniques to the user voice that is input through a microphone of the electronic apparatus 100. For example, the preset word may be "resident registration number", "bankbook number", "password" and the like, but is not necessarily limited thereto, and may be variously set according to a user command.

The user voice to which the CAPTCHA technique is applied may be a subsequent voice after the predetermined word is input. However, this is merely an example, and the CAPTCHA technique may be applied to both the preset word and the subsequent voice. The subsequent voice may be a voice input within a preset time after a preset word is input. For example, the subsequent voice may be a voice that is input within five seconds after a user voice of "password" is input, but is not limited thereto.

The electronic apparatus 100 or the server (not shown) may analyze the call content through the STT algorithm and when the number is included in the call content, the electronic apparatus 100 or the server may apply the aforementioned various CAPTCHA techniques to the user voice that is input through the microphone of the electronic apparatus 100.

Accordingly, in this disclosure, a case of exposing important information in a situation where a user of the electronic apparatus 100 may not recognize may be prevented and/or avoided.

An embodiment of transmitting CAPTCHA information corresponding to the user voice to an external device even without receiving a user command may be performed, not performed, or limitedly performed depending on user options.

For example, when an automatic CAPTCHA function is set to "On", the electronic apparatus 100 or the server (not shown) may automatically generate CAPTCHA information in a case where a preset word is included in the call content, or the like, and transmit the information to an external device, and when the automatic CAPTCHA function is set to "Off", even if a preset word is included in a call content, the CAPTCHA information may not be automatically generated and transmitted to an external device.

In addition, when the automatic CAPTCHA function is set to "apply when calling with the number not in the address book", while a call is performed with a phone number that does not match a plurality of pre-stored phone numbers, the electronic apparatus 100 or the server (not shown) may automatically generate and transmit the CAPTCHA information to an external device when the preset word is included in the contents of the call, or the like, and while making a call with the phone number matching one of the plurality of stored phone numbers, even if a word is included in the call content, the CAPTCHA information may be automatically generated and not transmitted to an external device.

Figure 7:
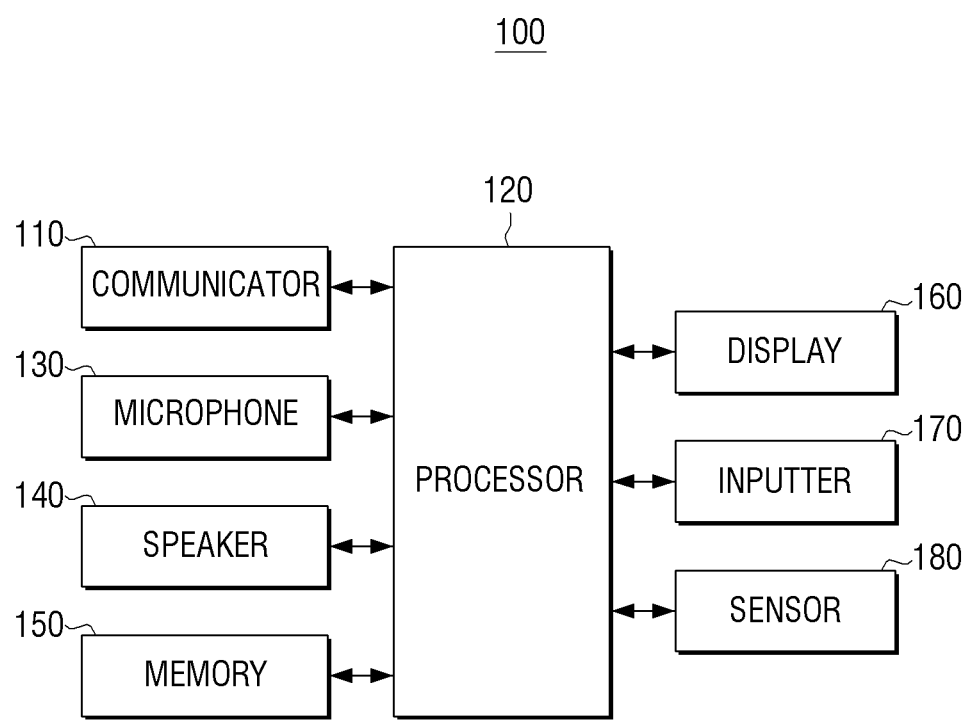
FIG. 7 is a block diagram illustrating an example electronic apparatus according to an embodiment.

FIG. 7 is a block diagram illustrating an example electronic apparatus according to an embodiment.

Referring to FIG. 7, the electronic apparatus 100 according to an embodiment may include a communicator (e.g., including communication circuitry) 110, a microphone 130, a speaker 140, a memory 150, a display 160, an inputter (e.g., including input circuitry) 170, a sensor 180, and the processor (e.g., including processing circuitry) 120. The part overlapped with the above description may not be repeated here.

The microphone 130 may receive a user voice. For example, the microphone 130 may receive a user voice during a call. In addition, the microphone 130 may convert the input user voice into an electrical signal and transmit it to the processor 120. Accordingly, the processor 120 may transmit an electrical signal corresponding to the user voice to an external device.

The speaker 140 may, for example, include a component outputting various audio data on which various processes such as, for example, and without limitation, decoding, amplification, noise filtering, and the like, are performed by an audio processor (not illustrated). In addition, the speaker 140 may output various notification sounds or a voice message. According to an embodiment, the processor 120 may convert an electric signal received from an external device to a user voice and output the voice through the speaker 140.

The memory 150 may store various modules for driving the electronic apparatus 100. For example, the memory 150 may store software including, for example, and without limitation, a base module, a sensing module, a communication module, a presentation module, a web browser module, a service module, etc. The base module may refer, for example, to a basic module that processes signals transmitted from the respective hardware included in the electronic apparatus 100 and transfers the signals to an upper layer module. The sensing module may refer, for example, to a module for collecting information from various sensors and analyzing and managing collected information, and may include, for example, and without limitation, a face recognition module, a voice recognition module, a motion recognition module, a near-field communication (NFC) recognition module, an object recognition module, or the like. The presentation module may refer, for example, to a module for constructing a display screen, and may include a user interface (UI) and a UI rendering module for performing graphics processing. The communication module may refer, for example, to a module for performing communication with the external device. The web browser module may refer, for example, to a module that accesses a web server by performing web browsing. The service module may refer, for example, to a module that includes various applications for providing various services.

The display 150 may display various images. For example, the display 150 may display information on the counterpart requesting a call.

The display 160 may be implemented as various types of displays such as, for example, and without limitation, a liquid crystal display (LCD), plasma display panel (PDP), or the like. In the display 160, a backlight unit, a driving circuit which may be implemented as a format such as an a-si TFT, low temperature poly silicon (LTPS) TFT, organic TFT (OTFT), or the like, may be included as well. The display 160 may be combined with a touch sensor and implemented as a touch screen The inputter 170 may include various input circuitry and receive a user input. For example, the inputter 170 may include various input circuitry, such as, for example, and without limitation, a button, a touch screen, or the like. The user may perform a touch, or the like, through the inputter 170.

The sensor 180 may sense a motion of the electronic apparatus 100. To be specific, the sensor 180 may be implemented, for example, and without limitation, as an acceleration sensor, a gyro sensor, a geomagnetic sensor, or the like, and may sense a motion of the electronic apparatus 100.

Figure 8:
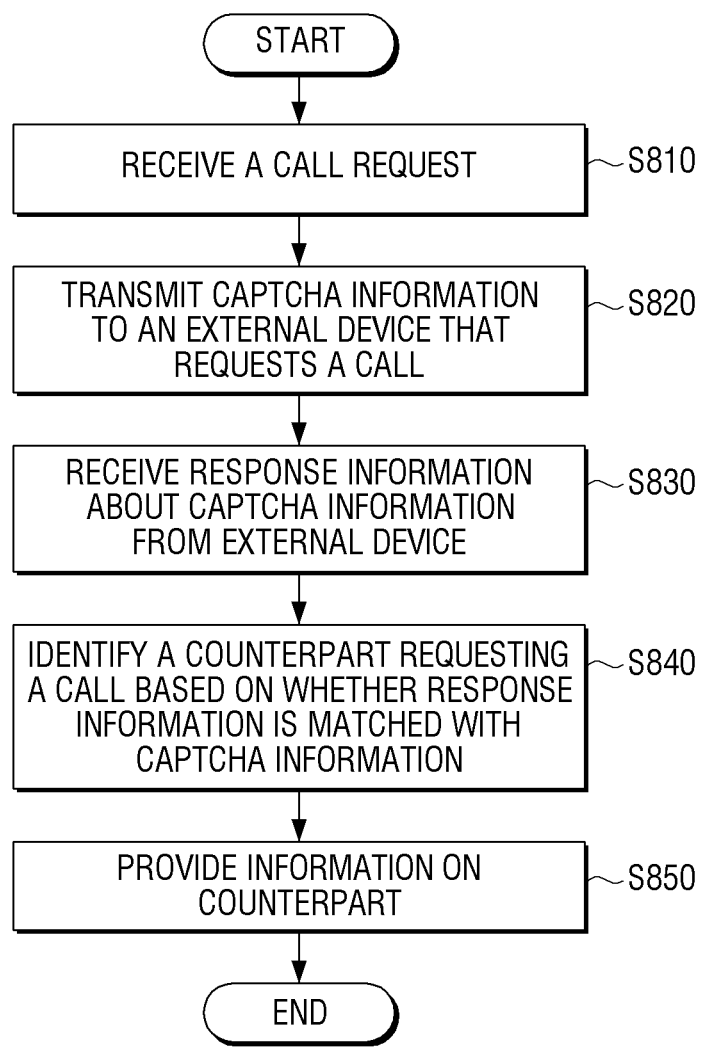
FIG. 8 is a flowchart illustrating an example operation of an electronic apparatus according to an embodiment.

FIG. 8 is a flowchart illustrating an example operation of an electronic apparatus according to an embodiment.

The electronic apparatus may receive a call request in operation S810. For example, the electronic apparatus may receive a call request from an external device through a mobile communication network, a wired communication network, or Internet. The external device may, for example, include a device for transmitting a call request and may be a sender that attempts call connection to the electronic apparatus 100.

When a call request is received, the electronic apparatus may transmit the CAPTCHA information to an external device requesting a call in operation S820. For example, the CAPTCHA information may include information to distinguish whether the counterpart of a call request is a user or a voice assistant and may be various information such as, for example, and without limitation, audio CAPTCHA, text CAPTCHA, image CAPTCHA, or the like.

The electronic device may receive response information about the CAPTCHA information from the external device in operation S830.

The electronic apparatus may determine (e.g., identify) the counterpart which requests a call, based on whether the response information and the CAPTCHA information are matched with each other in operation S840. For example, when the response information and the CAPTCHA information are matched, the electronic apparatus may determine that the counterpart requesting a call is a user and when the response information and the CAPTCHA information are not matched, the electronic apparatus may determine that the counterpart requesting a call is a voice assistant.

The electronic apparatus may provide information on the counterpart that requests a call in operation S850. For example, the electronic apparatus may provide information on the counterpart through the display and provide information on the counterpart through a speaker.

Accordingly, the user of the electronic apparatus may confirm whether the counterpart requesting a call is a user or a voice assistant, and the user may prepare for a case where personal information is leaked by the malicious voice assistant.

According to various embodiments as described above, a call recipient may confirm whether the counterpart requesting a call is a user or a voice assistant, and the call recipient may prepare for a case where personal information is leaked by the malicious voice assistant.

The methods according to various embodiments may be implemented as a format of software or application installable to a related art electronic apparatus.

The methods according to various embodiments may be implemented by software upgrade of a related art electronic apparatus, or hardware upgrade only.

The various embodiments described above may be implemented through an embedded server provided in the electronic apparatus or a server outside the electronic apparatus.

A non-transitory computer readable medium which stores a program for sequentially executing a method for controlling an electronic apparatus according to an embodiment may be provided.

The non-transitory computer readable medium refers to a medium that is readable by an apparatus. To be specific, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely examples and are not limiting. The disclosure can be readily applied to other types of apparatuses. Also, the description of the embodiments of the disclosure is intended to be illustrative, and not to limit the scope of the claims, and many alternatives, modifications, and variations will be apparent to those skilled in the art. While one or more example embodiments have been illustrated and described with reference to the figures, it will be understood by those of ordinary skill in the art that various changes in form and details may be made therein without departing from the spirit and scope as set forth, for example, in the following claims and their equivalents.

What is claimed is:

1. An electronic apparatus comprising:
   a communicator comprising communication circuitry; and
   a processor configured to control the electronic apparatus to:
   in response to a call request being received through the communicator from an external device, connect a call with the external device that requests the call based on receiving a command to accept the call request from a user of the electronic apparatus;
   after accepting the call request and receiving a user command to transmit CAPTCHA information during the call, transmit first CAPTCHA information corresponding to a voice of the user of the electronic apparatus, through the communicator, to the external device that requests the call;
   identify a counterpart that requests the call through the external device based on whether response information is matched with the first CAPTCHA information in response to receiving the response information about the first CAPTCHA information from the external device; and
   provide, through a display and/or a speaker, information on the identified counterpart to the user, and
   wherein the processor is further configured to control the electronic apparatus to:
   based on the response information not being received within a preset time from a time when the first CAPTCHA information is transmitted, identify the counterpart that requests the call as a voice assistant,
   based on receiving the response information after elapse of the preset time, transmit, to the external device, second CAPTCHA information of a type different from the first CAPTCHA information, and
   based on response information on the second CAPTCHA information being received, identify a counterpart that requests the call based on whether the received response information is matched with the second CAPTCHA information.

2. The electronic apparatus of claim 1, wherein the processor is further configured to control the electronic apparatus to:
   identify that the counterpart that requests the call is a user based on the response information being matched with the first CAPTCHA information, and identify that the counterpart that requests the call is the voice assistant based on the response information not being matched with the first CAPTCHA information.

3. The electronic apparatus of claim 1, further comprising:
a display,
wherein the processor is further configured to control the electronic apparatus to:
display, on the display, information indicating that the counterpart that requests the call is being identified based on the call request being received, and
display, on the display, information on the identified counterpart based on the counterpart that requests the call being identified.

4. The electronic apparatus of claim 1, further comprising:
a memory configured to store a plurality of telephone numbers,
wherein the processor is further configured to control the electronic apparatus to:
identify whether a telephone number corresponding to the counterpart that requests the call is matched with at least one of the plurality of stored telephone numbers based on the call request being received, and
transmit the first CAPTCHA information to the external device based on the telephone number corresponding to the counterpart that requests the call not being matched with the plurality of stored telephone numbers.

5. The electronic apparatus of claim 1, wherein the processor is further configured to control the electronic apparatus to, in a call standby state, transmit the first CAPTCHA information to the external device that requests a call.

6. The electronic apparatus of claim 1, wherein the first CAPTCHA information includes audio CAPTCHA.

7. The electronic apparatus of claim 1, comprising the speaker and the display.

8. The electronic apparatus of claim 1, wherein the first CAPTCHA information includes audio CAPTCHA, and the second CAPTCHA information includes at least one of text CAPTCHA, image CAPTCHA, motion CAPTCHA, or slide CAPTCHA.

9. The electronic apparatus of claim 1, wherein the voice of the user is input through a microphone of the electronic apparatus and the processor is further configured to distort the voice of the user and the distorted voice is included in the transmitted first CAPTCHA information.

10. A method of controlling an electronic apparatus, the method comprising:
in response to a call request being received through a communicator of the electronic apparatus from an external device, connecting a call between the electronic apparatus and the external device that requests the call based on receiving a command through the communicator to accept the call request from a user of the electronic apparatus by a processor of the electronic apparatus;
after accepting the call request and receiving a user command to transmit CAPTCHA information during the call, transmitting, through the communicator, first CAPTCHA information corresponding to a voice of the user of the electronic apparatus to the external device that requests the call by the processor of the electronic apparatus;
identifying, by the processor of the electronic apparatus, a counterpart that requests the call through the external device based on whether response information is matched with the first CAPTCHA information in response to receiving the response information about the first CAPTCHA information from the external device; and
providing, through a display or a speaker, information on the identified counterpart to the user by the processor of the electronic apparatus, and
wherein the identifying comprises:
based on the response information not being received within a preset time from a time when the first CAPTCHA information is transmitted, identifying the counterpart that requests the call as a voice assistant;
based on receiving the response information after elapse of the preset time, transmitting, to the external device, second CAPTCHA information of a type different from the first CAPTCHA information; and
based on response information on the second CAPTCHA information being received, identifying a counterpart that requests the call based on whether the received response information is matched with the second CAPTCHA information.

11. The method of claim 10, wherein the identifying comprises, based on the response information being matched with the first CAPTCHA information, identifying that the counterpart that requests the call is a user, and based on the response information not being matched with the first CAPTCHA information, identifying that the counterpart that requests the call is the voice assistant by the processor of the electronic apparatus.

12. The method of claim 10, wherein the providing comprises, based on the call request being received, displaying information indicating that the counterpart that requests the call is being identified on a display of the electronic apparatus by the processor of the electronic apparatus, and based on the counterpart that requests the call being identified, displaying information on the identified counterpart on a display of the electronic apparatus by the processor of the electronic apparatus.

13. The method of claim 10, wherein the transmitting comprises, based on the call request being received, identifying whether a telephone number corresponding to the counterpart that requests the call is matched with at least one of a plurality of stored telephone numbers, and based on the telephone number corresponding to the counterpart that requests the call not being matched with the stored telephone numbers, transmitting the first CAPTCHA information to the external device by the processor of the electronic apparatus.

14. The method of claim 10, wherein the transmitting comprises, in a call standby state, transmitting the first CAPTCHA information to the external device that requests a call by the processor of the electronic apparatus.

15. The method of claim 10, wherein the first CAPTCHA information includes audio CAPTCHA.

16. An electronic apparatus comprising:
a microphone;
a communicator comprising communication circuitry; and
a processor configured to control the electronic apparatus to:
in response to a call request being received through the communicator from an external device, connect a call with the external device that requests the call based on receiving a command to accept the call request from a user of the electronic apparatus;
after accepting the call request and receiving a user command to transmit CAPTCHA information during the call, receive a voice of the user through the microphone and obtain first CAPTCHA information corresponding to the voice of the user and transmit the first CAPTCHA information corresponding to the voice of the user to an external device that requests the call, through the communicator, to the external device that requests the call;

identify a counterpart that requests the call through the external device based on whether response information is matched with the first CAPTCHA information in response to receiving the response information about the first CAPTCHA information from the external device; and provide, through a display and/or a speaker, information on the identified counterpart to the user, and wherein the processor is further configured to control the electronic apparatus to:

based on the response information not being received within a preset time from a time when the first CAPTCHA information is transmitted, identify the counterpart that requests the call as a voice assistant, based on receiving the response information after elapse of the preset time, transmit, to the external device, second CAPTCHA information of a type different from the first CAPTCHA information, and based on response information on the second CAPTCHA information being received, identify a counterpart that requests the call based on whether the received response information is matched with the second CAPTCHA information.

* * * * *